United States Patent
Manfe (10) Patent No.: US 9,900,294 B2
(45) Date of Patent: Feb. 20, 2018

(54) KEY-BASED ACCESS IN BATCH MODE

(71) Applicant: Oracle International Corporation, Redwood Shores, CA (US)

(72) Inventor: Thierry Manfe, Montbonnot Saint Martin (FR)

(73) Assignee: Oracle International Corporation, Redwood Shores, CA (US)

( * ) Notice: Subject to any disclaimer, the term of this patent is extended or adjusted under 35 U.S.C. 154(b) by 122 days.

(21) Appl. No.: 15/096,249

(22) Filed: Apr. 11, 2016

(65) Prior Publication Data

US 2017/0295147 A1 Oct. 12, 2017

(51) Int. Cl.
*H04L 29/06* (2006.01)

(52) U.S. Cl.
CPC ........ *H04L 63/0442* (2013.01); *H04L 63/061* (2013.01); *H04L 63/083* (2013.01)

(58) Field of Classification Search
CPC .......................... H04L 63/0442; H04L 63/083
See application file for complete search history.

(56) References Cited

U.S. PATENT DOCUMENTS

| | | | | |
|---|---|---|---|---|
| 8,774,407 B2* | 7/2014 | Eklund | ................... | G06F 21/51 380/255 |
| 9,143,530 B2* | 9/2015 | Qureshi | ................... | H04L 63/20 |
| 9,280,677 B1* | 3/2016 | Perry | ................... | G06F 21/6218 |
| 9,336,403 B2* | 5/2016 | Keohane | ............. | G06F 21/6209 |
| 2007/0143827 A1* | 6/2007 | Nicodemus | ......... | G06F 21/6218 726/2 |
| 2009/0138703 A1* | 5/2009 | Schneider | ............... | G06F 21/31 713/155 |
| 2011/0040933 A1* | 2/2011 | Swindell | ............... | G06F 21/305 711/104 |
| 2011/0099608 A1* | 4/2011 | Queck | ................. | G06F 21/6209 726/4 |
| 2011/0197065 A1* | 8/2011 | Stauth | ..................... | H04L 63/08 713/170 |
| 2013/0117554 A1 | 5/2013 | Ylonen | | |
| 2014/0380462 A1* | 12/2014 | Hosoda | ................... | G06F 21/31 726/17 |
| 2015/0193629 A1* | 7/2015 | Hajost | .................. | G06F 21/602 713/189 |
| 2015/0326556 A1* | 11/2015 | Vadura | ................ | H04L 63/0815 726/4 |

(Continued)

OTHER PUBLICATIONS

Webmin Documentation, "SSH Server", http://doxfer.webmin.com/Webmin/SSH_Server, Aug. 9, 2015, 13 pages.

(Continued)

*Primary Examiner* — Ali Shayanfar
(74) *Attorney, Agent, or Firm* — Osha Liang LLP (57) ABSTRACT

A method for accessing a remote computer system may include obtaining a private key, storing the private key in a file system owned by a root account, disabling login access to the root account from user accounts, installing a secure application with root execution privileges, mounting, via the secure application, the file system, obtaining, via the secure application, the private key from the file system, and accessing, via the secure application and over a network, the remote computer system using the private key.

17 Claims, 5 Drawing Sheets

(56) References Cited

U.S. PATENT DOCUMENTS

2017/0109190 A1* 4/2017 Sha .................... G06F 9/45558

OTHER PUBLICATIONS

Davidoff, S., "Cleartext Passwords in Linux Memory", Jul. 26, 2008, 13 pages.
Geek 2.0, "Mac OS X Makes Handling SSH Keys Easier", http://www.stormacq.com/mac-os-x-makes-handling-ssh-keys-easier, Jun. 5, 2014, 3 pages.
ArchWiki, "SSH Keys", https://wiki.archlinux.org/index.php/SSH_keys, Apr. 3, 2016, 19 pages.
Ellingwood, J., "SSH Essentials", DigitalOcean, https://www.digitalocean.com/community/tutorials/ssh-essentials-working-with-ssh-servers-clients-and-keys, Oct. 16, 2014, 41 pages.
"Public and Private Keys", Community Help Wiki, https://help.ubuntu.com/community/SSH/OpenSSH/Keys, Jul. 30, 2015, 3 pages.
"Storing Your Keys: SSH—Agent, Agent Forwarding, and Keychain", https://wiki.harvard.edu/confluence/display/USERDOCS/Storing+Your+Keys+-+SSH-Agent,+Agent+Forwarding,+and+Keychain, May 21, 2012, 4 pages.
"Deft—General Cheat Sheet", http://physics.oregonstate.edu/~roundyd/deft/doc/general-cheat-sheet.html, 3 pages.

* cited by examiner

KEY-BASED ACCESS IN BATCH MODE

BACKGROUND

Administrative software tools often need to connect to multiple systems (e.g., servers, switches and storage devices) with root or super-user privileges in batch mode (i.e., without the operator entering a password). Such tools are often run from a root account rather than a least privileged account because a least privileged account may be unknown or unavailable to the application developer. Even if a least privileged account were known, the privileges attached to such an account may be insufficient, may be changed in future releases, and/or the account itself may be deleted.

To access multiple systems in batch mode, encryption keys may be created and deployed on the multiple systems. Authentication may be based on these encryption keys, eliminating the need to authenticate by prompting for a password. This avoids security risks due to eavesdropping of passwords, or brute-force password attacks. However, storing private encryption keys represents a potential security vulnerability if a rogue entity obtains access to a system (and therefore an encryption key) by logging into a root account. Not only will the security of that system be compromised, but the security of other systems interacting with the compromised system may also be compromised.

SUMMARY

In general, in one aspect, one or more embodiments relate to a method for accessing a remote computer system including obtaining a private key, storing the private key in a file system owned by a root account, disabling login access to the root account from user accounts, installing a secure application with root execution privileges, mounting, via the secure application, the file system, obtaining, via the secure application, the private key from the file system, and accessing, via the secure application and over a network, the remote computer system using the private key.

In general, in one aspect, one or more embodiments relate to a system for accessing a remote computer system including a computer processor and a memory comprising instructions that, when executed by the computer processor, cause the processor to obtain a private key, store the private key in a file system owned by a root account, disable login access to the root account from user accounts, install a secure application with root execution privileges, mount, via the secure application, the file system, obtain, via the secure application, the private key from the file system, and access, via the secure application and over a network, the remote computer system using the private key.

In general, in one aspect, one or more embodiments of the invention relate to a non-transitory computer readable medium including instructions that, when executed by a processor, perform a method for accessing a remote computer system including obtaining a private key, storing the private key in a file system owned by a root account, disabling login access to the root account from user accounts, installing a secure application with root execution privileges, mounting, via the secure application, the file system, obtaining, via the secure application, the private key from the file system, and accessing, via the secure application and over a network, the remote computer system using the private key.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a method, a system, and a non-transitory computer readable medium (CRM) for accessing a remote computer system. The remote computer system may be accessed by a secure application, using a private key. The private key may be owned by a root account or a key account. The key account may be a least privileged account that has the required privileges to access and read the private key. Execution of the secure application may be restricted to a different least privileged account. The secure application itself may have execution privileges (i.e., execution privileges of the root account or key account) sufficient to access the private key. Interactive, login-based access to the root account and to the key account may be disabled to prevent the private key from being accessed by a potential attacker attempting to interactively acquire root or key account privileges. The secure application and root and least privileged accounts may be placed in a virtual machine in order to limit the impact of security restrictions on other applications. Furthermore, when the secure application using the private key is not executing, the file system containing the private key may not be mounted. The key account may have the required privileges to mount this file system. In addition, an encrypted file system, owned by the root account or key account, may be used to store the private key. Embodiments of the invention may apply to any process that may be executed interactively or in batch mode and provides key-based access. Embodiments of the invention may prevent the process from being executed interactively, therefore blocking a potential attacker attempting to interactively connect to the system where the process is executed.

Figure 1:
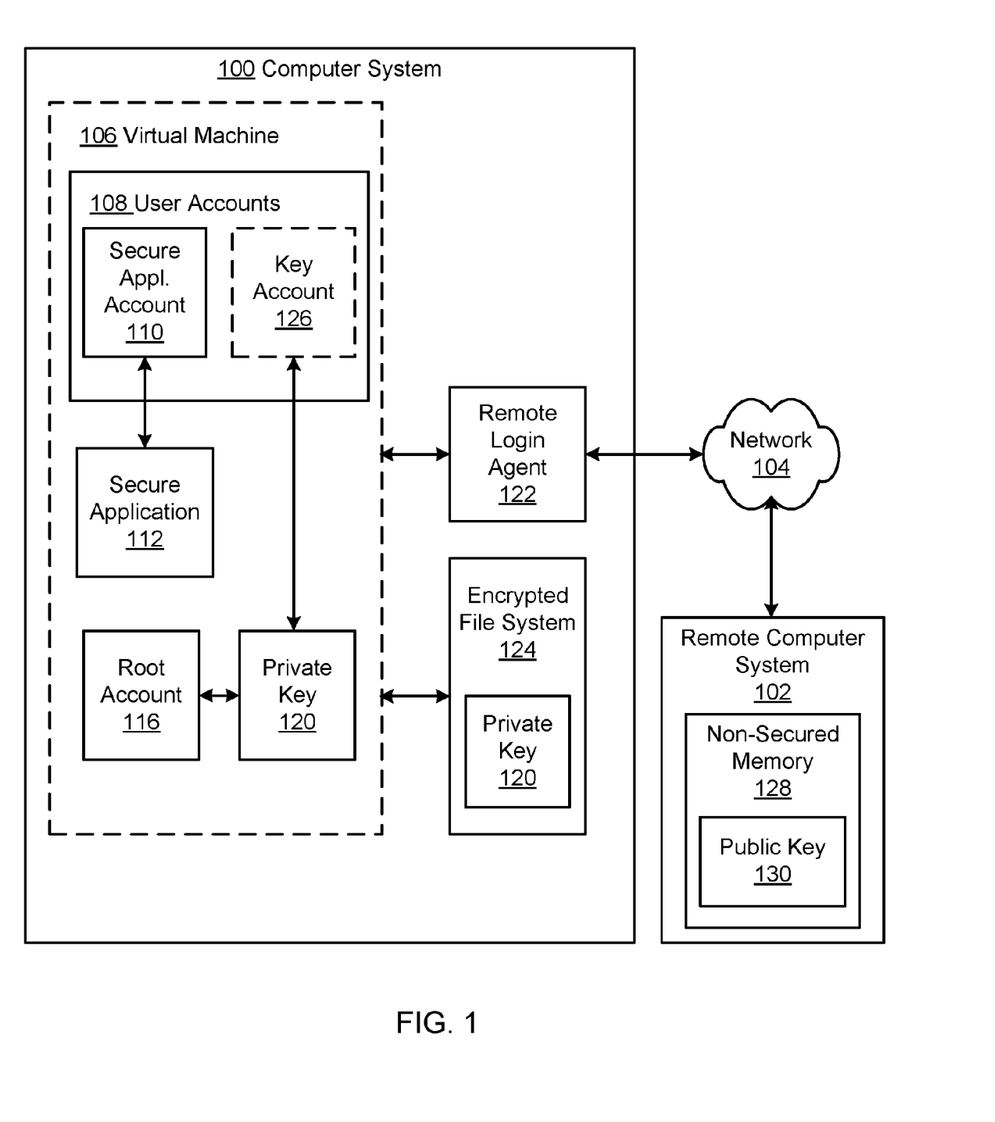
FIG. 1 shows a system in accordance with one or more embodiments disclosed herein.

FIG. 1 shows a system in accordance with one or more embodiments. As shown in FIG. 1, the system includes a computer system (100), a remote computer system (102), and a network (104). In one or more embodiments, both the computer system (100) and remote computer system (102) may be the computing system (500) described with respect to FIG. 5A and the accompanying description below, or may be the client device (526) described with respect to FIG. 5B. Furthermore, the network (104) may be the network (520) described with respect to FIG. 5B.

In one or more embodiments, the computer system (100) and remote computer system (102) may communicate via a secure protocol over the network (104). For example, the secure shell (SSH) protocol suite allows remote login, remote command execution and other network services to operate securely over an unsecured network (104). In one or more embodiments, a secure protocol may be based on public-key authentication that relies on asymmetric cryptographic algorithms to generate a key pair consisting of a private key (120) and a public key (130), described below. In one or more embodiments, the private key (120) and the public key (130) may be obtained from a key generation program, from a key distribution authority, or from some other trusted source. The private key (120) may be kept secret and may be stored on the computer system (100) used to connect to the remote computer (102). The public key (130) may be stored on the remote computer system (102) (e.g., in a file containing a list of authorized public keys). The public key (130) may be stored on each remote computer (102) to which the computer system (100) may connect.

Continuing with FIG. 1, in one or more embodiments, the computer system (100) may include a virtual machine (106), a remote login agent (122), and an encrypted file system (124). In one or more embodiments, the virtual machine (106) may include user accounts (108), a secure application (112), and a root account (116). In one or more embodiments, the virtual machine (106) may run as a process of the computer system (100). In one or more embodiments, the virtual machine (106) may be implemented as a non-global zone (e.g., on a computer system (100) that runs a Unix-like operating system, such as Solaris). The virtual machine (106) is optional. In other words, in one or more embodiments, the computer system (100) may not include a virtual machine (106), and the computer system (100) may directly include the user accounts (108), the secure application (112), and the root account (116), as described below.

The computer system (100) may include user accounts (108) for one or more users of the computer system (100). Each user account (108) allows a user to be authenticated by the computer system (100). In one or more embodiments, a user may be required to authenticate himself or herself with a password or other credentials. Each user account (108) may have associated privileges to access, modify and/or execute the resources of the computer system (100).

The user accounts (108) may include a secure application account (110) with a minimal set of privileges to access, modify and/or execute the resources of the computer system (100). In one or more embodiments, the secure application account (110) is a least privileged account that may have privileges to execute the secure application (112). In one or more embodiments, the user accounts (108) may include a key account (126) that is a least privileged account with a minimal set of privileges to access, modify and/or execute the resources of the computer system (100). In one or more embodiments, the key account (126) may have the privileges to mount the encrypted file system (124) and read the private key (120). In one or more embodiments, the secure application (112) may be an administrative software tool, for example, a backup, diagnostic, installation, update or monitoring tool. In one or more embodiments, the ability to execute the secure application (112) may be restricted to the secure application account (110). For example, the secure application (112) may check a user id of a user account (108) executing the secure application (112) to ensure that only the secure application account (110) is permitted to execute the secure application (112).

In one or more embodiments, the secure application (112) may be owned by the root account (116). In one or more embodiments, the secure application (112) may be owned by the key account (126). In one or more embodiments, the privileges associated with the secure application (112) may specify that the secure application (112) executes with the root account (116) or key account (126) privileges. For example, if the computer system (100) is running a UNIX-like operating system, then setting a setuid bit of the secure application (112) may indicate that the secure application (112) executes with the privileges of its owner (e.g., the root account (116) or the key account (126)). Root or key account privileges may be assigned (e.g., the setuid bit of the secure application (112) may be set) when the secure application (112) is installed in the computer system (100). In contrast, applications that do not have the setuid bit set may be executed with the privileges of the user account (108) launching the application.

The secure application (112) may be implemented in hardware (i.e., circuitry), software, or any combination thereof. In one or more embodiments of the invention, the secure application (112) is a collection of source code. That is, the secure application (112) may be a collection of computer instructions written in a human-readable programming language. The secure application (112) may be transformed by a compiler program into binary machine code. Compiled machine code may then be executed by a processor in order to run the application generated from the secure application (112).

In one or more embodiments, the computer system (100) may include a root account (116) with broad (e.g., superuser) privileges to access, modify and execute various resources of the computer system (100). In one or more embodiments, the root account (116) may be a special account used for system administration. In one or more embodiments, the root account (116) may include a root home directory within a file system of the computer system (100). The root home directory may store the private key (120) that may be used to access the remote computer system (102) over the network (104).

The root account (116) may represent a security vulnerability due to its broad privileges. Therefore, for security reasons, it may be useful to disable the root account (116) to prevent a potential attacker from acquiring root privileges by logging into the root account (116). In one or more embodiments, the root account (116) may be disabled by converting the root account (116) to a non-login account. A non-login account is an account to which interactive login access is prohibited. In one or more embodiments, the root account (116) may be converted to a root role. A role may be a set of related privileges. A role may be assigned to one or more user accounts (108). When the root account (116) has been converted to a role, a user account (108) may be assigned the root role in order to permit that user account (108) to endorse the root role and exercise root privileges. A role does not allow a user to login to the computer system. The user must first login with a user account (108) and then endorse the role. Endorsing a role may require an additional authentication step. In one or more embodiments, endorsing the root role may be disabled by ensuring that no user account (108) is assigned the root role, and deleting any prior assignments of the root role to a user account (108).

In one or more embodiments, the private key (120) may be owned by a least privileged key account (126), instead of being owned by the root account (116). In one or more embodiments, the least privileged key account (126) may be converted to a non-login account. In one or more embodiments, the non-login key account (126) would have sufficient privileges to access (i.e., mount) the encrypted file system (124). In addition, in this scenario, the root account (116) may also be converted to a non-login account or into a role, where endorsing the root role would be disabled for all user accounts (108).

In one or more embodiments, as mentioned above, the root account (116) and the user accounts (108) may be contained within a virtual machine (106) (e.g., a non-global zone of the Solaris operating system). In one or more embodiments, disabling interactive access to the root account (116) contained in the virtual machine (106) may have the effect of disabling interactive access to the root account (116) locally within the context of the virtual machine (106). In one or more embodiments, disabling interactive access to the key account (126) contained in the virtual machine (106) may have the effect of disabling interactive access to the key account (126) locally within the context of the virtual machine (106). That is, no user account (108) local to the virtual machine (106) would be able to interactively (i.e., either by logging into the root account (116) or the key account (126), or by assuming the root role) acquire root or key account privileges. In this scenario, root or key account privileges may still be acquired in the virtual machine (106) by remotely logging in, as the root account (116) or as the key account (126), from the virtual machine's (106) hypervisor (e.g., a global zone of the Solaris operating system).

In one or more embodiments, as mentioned above, the secure application (112) may be installed in the virtual machine (106) of the computer system (100). Essentially, the virtual machine (106) represents a computing environment dedicated to the secure application (112) that isolates the secure application (112) from other applications that are also hosted on the computer system (100). Therefore, security restrictions related to the secure application (112) (e.g., disabling interactive access to the root account (116) or root role) do not restrict other applications that are hosted on the computer system (100).

In one or more embodiments, the secure application (112) may include functionality to mount, access and unmount an encrypted file system (124), described below. In one or more embodiments, the secure application (112) may include functionality to obtain the private key (120) from the encrypted file system (124). In one or more embodiments, the secure application (112) may include functionality to access the remote computer system (102) over the network (104) in batch mode (i.e., without providing login credentials or a password) using the private key (120) obtained from the encrypted file system (124).

Continuing with FIG. 1, in one or more embodiments, the computer system (100) may include a remote login agent (122) and an encrypted file system (124). In one or more embodiments, the remote login agent (122) may communicate with the remote computer system (102) over the network (104) on behalf of one or more applications, including the secure application (112). The remote login agent (122) may be implemented in hardware (i.e., circuitry), software, or any combination thereof. In one or more embodiments, the remote login agent (122) includes functionality to receive the private key (120) from the secure application (112). In one or more embodiments, the remote login agent (122) includes functionality to communicate with the remote computer system (102) over the network (104) using the private key (120).

In one or more embodiments, the private key (120) may be stored in an encrypted file system (124). In one or more embodiments, the private key (120) may be copied from the root home directory to the encrypted file system (124) (e.g., Zeta File System (ZFS)). In one or more embodiments, to further enhance the security of the encrypted file system (124), a security parameter (e.g., a passphrase) may be required in order to obtain access to the encrypted file system (124). In one or more embodiments the passphrase required to access the encrypted file system (124) may differ from the encryption key. Furthermore, the security parameter may be changed periodically. For example, the security parameter may be changed after each access (e.g., mounting) of the encrypted file system (124). In one or more embodiments, root privileges may be required to access (i.e., mount) the encrypted file system (124).

In one or more embodiments, the encrypted file system (124) may be implemented as any type of storage unit and/or device (e.g., a database, collection of tables, or any other repository or storage mechanism) for storing data. Further, the encrypted file system (124) may include multiple different storage units and/or devices. The multiple different storage units and/or devices may or may not be of the same type or located at the same physical site.

The remote login agent (122) may be used to communicate with the remote computer system (102) over the network (104) using the private key (120). In one or more embodiments, the remote login agent (122) may execute for the duration of a login session corresponding to a user account (108) (e.g., a login session associated with the secure application account (110) executing the secure application (112)). In one or more embodiments, the remote login agent (122) begins execution when a login session of a user account (108) (e.g., the secure application account (110)) is initiated. In one or more embodiments, the remote login agent (122) may store a copy of the private key (120) in a memory region local to the remote login agent (122) in order to avoid needing to re-obtain the private key (120) from the encrypted file system (124) multiple times (e.g., to connect to multiple remote computer systems (102) using the same private key (120)).

Although not shown in FIG. 1, in one or more embodiments, the remote login agent (122) and the encrypted file system (124) may be included within the virtual machine (106).

Continuing with FIG. 1, in one or more embodiments, the remote computer system (102) may include a non-secured memory (128). The non-secured memory (128) may include a public key (130). In one or more embodiments, the public key (130) may correspond to the private key (120) in an asymmetric encryption protocol. In one or more embodiments, the non-secured memory (128) may be the non-persistent storage (504) or the persistent storage (506) described with respect to FIG. 5A and the accompanying description below.

While FIG. 1 shows a configuration of components, other configurations may be used without departing from the scope of the invention. For example, various components may be combined to create a single component. As another example, the functionality performed by a single component may be performed by two or more components.

Figure 2:
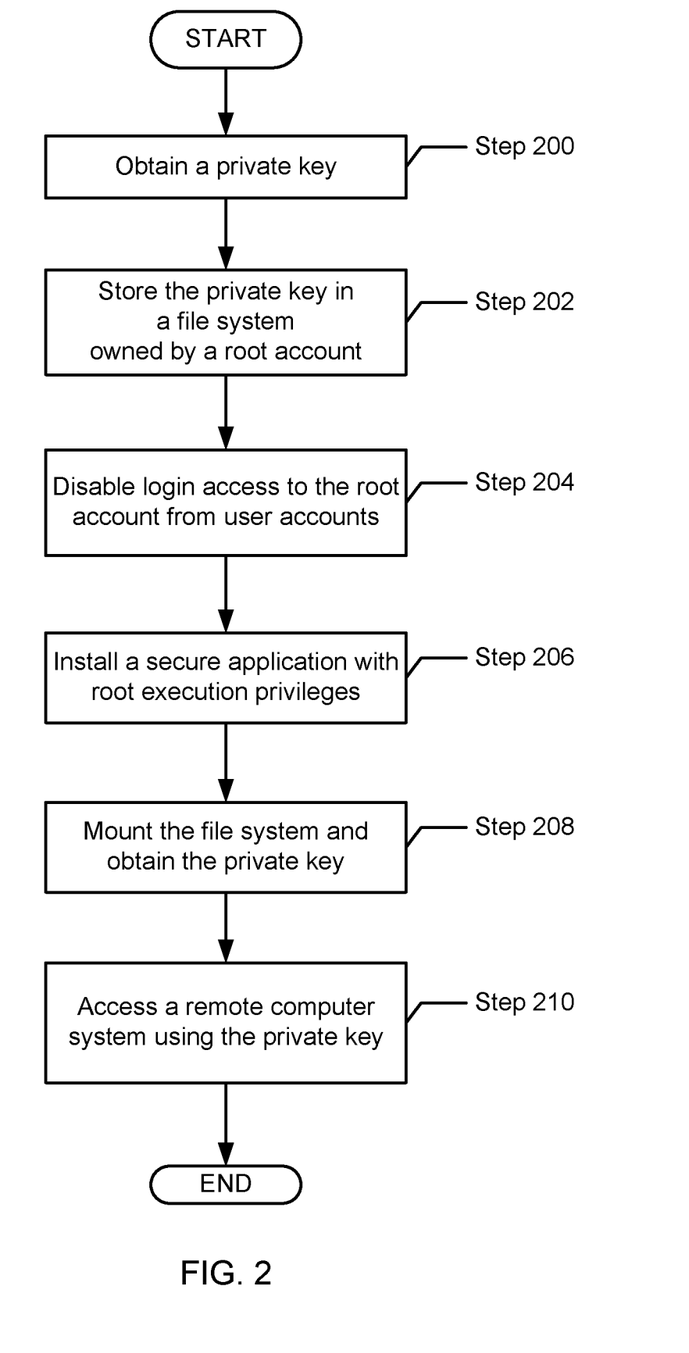
FIG. 2 and FIG. 3 show flowcharts in accordance with one or more embodiments disclosed herein.

FIG. 2 shows a flowchart in accordance with one or more embodiments of the invention. The flowchart depicts a process for accessing a remote computer system. One or more of the steps in FIG. 2 may be performed by the components of the computer system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, a private key is obtained. The private key may be obtained from a key generation program, from a key distribution authority, or from some other trusted source. The private key may correspond with a public key in an asymmetric cryptography scheme.

In Step 202, the private key is stored in a file system owned by a root account. In one or more embodiments, root access privileges may be required to access the file system. One or more security parameters (e.g., a passphrase or password) may be required in order to obtain access to the file system.

In Step 204, login (i.e., interactive) access from user accounts to the root account is disabled. This prevents a potential attacker from accessing the private key by logging into the root account.

In Step 206, a secure application is installed with root execution privileges. That is, when the secure application is executed, it has privileges associated with the root account, instead of the privileges associated with the user account (e.g., a least privileged account) launching the secure application. In one or more embodiments, the root account is the owner of the secure application. For example, the root account may be listed as the owner of the binary executable file or files corresponding to the secure application. If the computer system is running a UNIX-like operating system, then setting a setuid bit of the secure application may indicate that the secure application executes with the privileges of its owner (i.e., the root account). The arguments provided to the secure application may include one or more security parameters (e.g., to obtain access to the file system) and the name of a remote computer system to which the secure application will attempt to connect.

In Step 208, the secure application mounts the file system, and obtains the private key from the file system.

In Step 210, the remote computer system is accessed by the secure application over a network, using the private key. That is, the secure application does not need to provide login credentials or a password in order to access the remote computer system. In other words, the remote computer system is accessed in batch mode.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Figure 3:
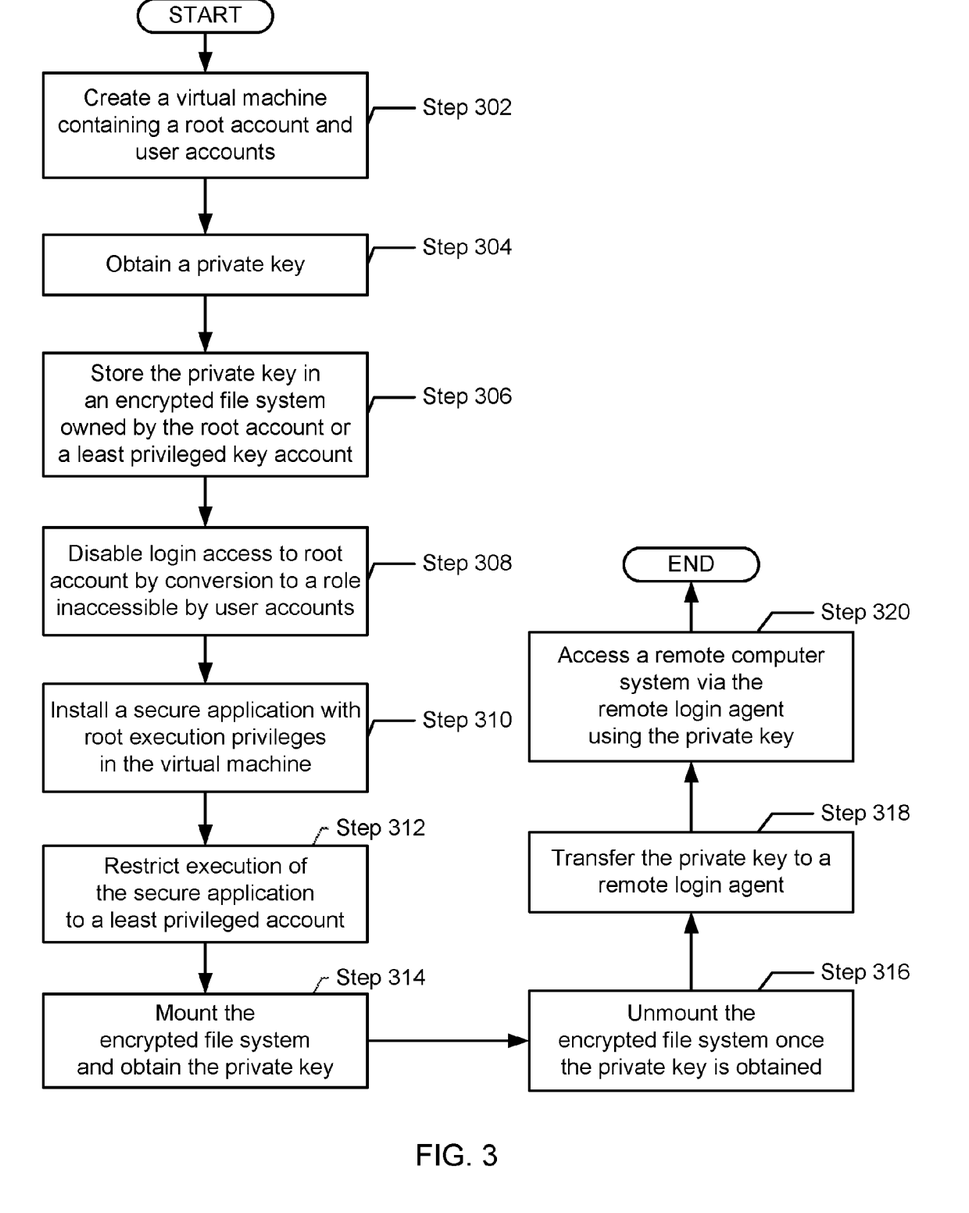

FIG. 3 shows a flowchart in accordance with one or more embodiments of the invention. The flowchart depicts a process, in more detail than FIG. 2, for accessing a remote computer system. One or more of the steps in FIG. 3 may be performed by the components of the computer system (100), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 302, a virtual machine is created that contains the root account and user accounts. In one or more embodiments the virtual machine also contains a key account. In one or more embodiments, the virtual machine (e.g., a non-global zone of the Solaris operating system) may run as a process of the computer system.

In Step 304, a private key is obtained as discussed above in the description of Step 200. In one or more embodiments, the private key may be stored in a root home directory of the computer system.

In Step 306, the private key is stored in an encrypted file system owned by the root account. The private key may be owned by the root account. In one or more embodiments, the private key and the encrypted file system may be owned by a least privileged key account. In one or more embodiments, root or key account access privileges may be required to access (i.e., mount) the encrypted file system. In addition, one or more security parameters (e.g., a passphrase or password) may be required in order to access the encrypted file system. In one or more embodiments, the private key may be removed from the root home directory after the private key is stored in the encrypted file system. In one or more embodiments, the encrypted file system may be unmounted once the private key has been stored in the encrypted file system.

In Step 308, the root account is converted to a root role. In one or more embodiments, the root role may be inaccessible by any user account, thereby preventing any user account in the virtual machine from interactively acquiring root privileges. Thereby, user accounts are prevented from accessing the encrypted file system. In one or more embodiments, interactive access to the root role may be disabled by ensuring that no user account is assigned the root role, and deleting any previous assignments of the root role to a user account. In one or more embodiments, the key account is converted to a non-login account. Converting the key account to a non-login account prevents any user account in the virtual machine from interactively acquiring key account privileges, and thereby accessing the encrypted file system.

In Step 310, a secure application is installed with root or key account execution privileges in the virtual machine. See previous description of Step 206. The secure application may access the encrypted file system, which requires root or key account privileges. The arguments provided to the secure application may include one or more security parameters (e.g., a passphrase used to access the encrypted file system) and the name of a remote computer system to which the secure application will attempt to connect.

In Step 312, execution of the secure application is restricted to a least privileged account. In one or more embodiments, the secure application may be designed to ensure (e.g., by checking the user id of user account attempting to execute the secure application) that the identity of the user account attempting to execute the secure application is the least privileged account. In other words, the secure application may be dedicated to the least privileged account.

In Step 314, the secure application mounts the encrypted file system, and obtains the private key from the encrypted file system. Although the least privileged account dedicated to the secure application may not have root or key account privileges, the secure application itself has root or key account execution privileges. Therefore, the secure application may mount the encrypted file system and obtain the private key.

In Step 316, the secure application unmounts the encrypted file system, once the private key has been obtained. This ensures that the encrypted file system is mounted briefly, thereby reducing the exposure of the private key to potential attackers. In one or more embodiments, after unmounting the encrypted file system, a security parameter (e.g., passphrase or password) of the encrypted file system may be modified (e.g., as a security precaution, in case a potential attacker has eavesdropped and obtained access to a previously used security parameter). For example, a passphrase required to access the encrypted file system may be modified (e.g., a passphrase may be modified to a random value at regular intervals, such as after each run of the secure application).

In Step 318, the private key is transferred to a remote login agent by the secure application. In one or more embodiments, the remote login agent may store a copy of the private key in a memory region local to the remote login agent. This avoids the need to re-obtain the private key from the encrypted file system multiple times during a login session (e.g., a login session associated with the least privileged account executing the secure application). In one or more embodiments, the remote login agent may execute for the duration of a login session corresponding to a user account of the computer system (e.g., a login session associated with the least privileged account executing the secure application). In one or more embodiments, the remote login agent begins execution when a login session of a user account of the computer system is initiated.

In Step 320, the remote computer system is accessed via the remote login agent over a network (e.g., via the SSH protocol), using the private key. The remote login agent does not need to provide login credentials or a password in order to access the remote computer system. That is, the remote computer system is accessed in batch mode.

The following example is for explanatory purposes only and not intended to limit the scope of the invention.

Figure 4:
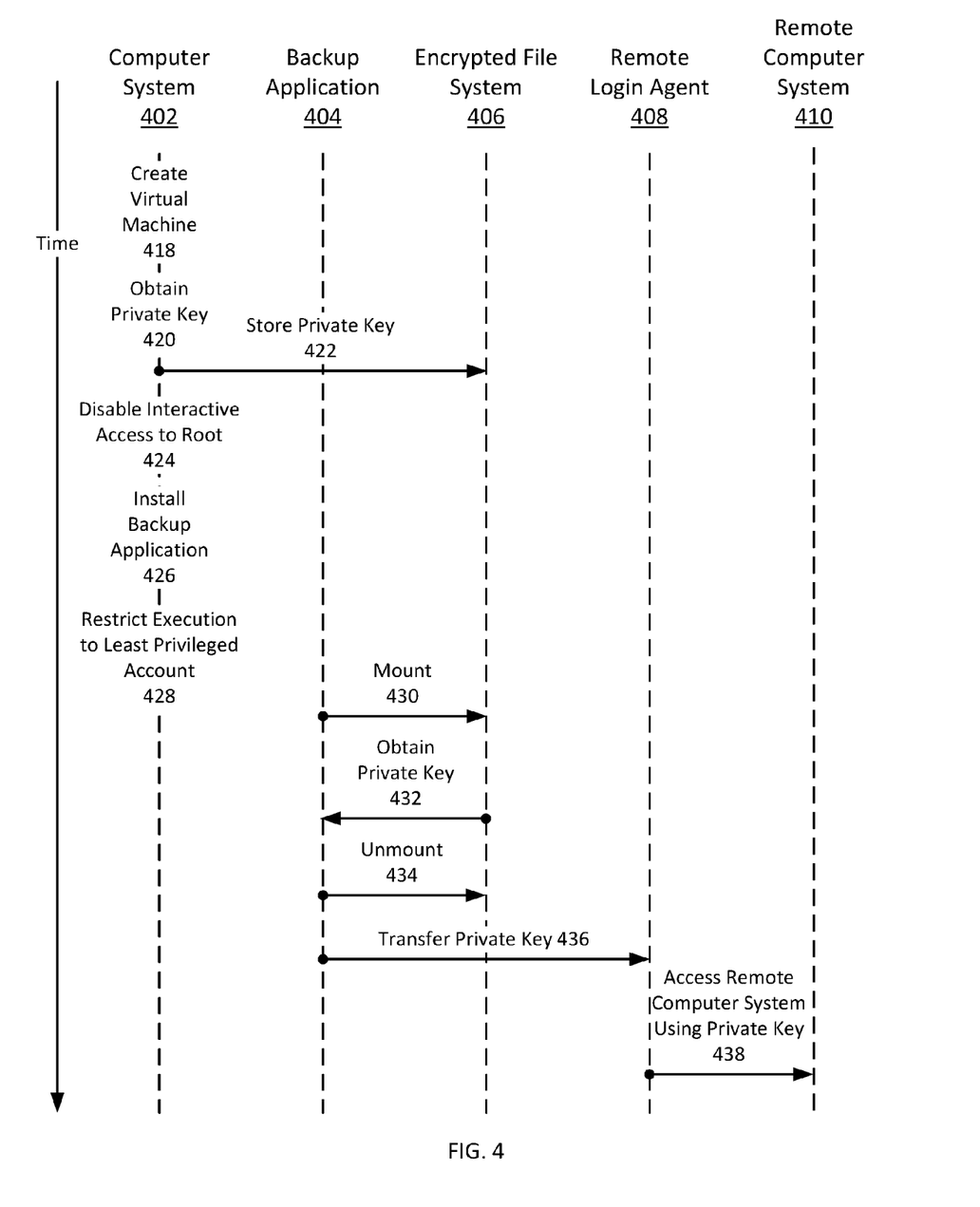
FIG. 4 shows an example in accordance with one or more embodiments disclosed herein.

The following example is for explanatory purposes only and not intended to limit the scope of embodiments disclosed herein. FIG. 4 illustrates, in accordance with one or more embodiments, the relative timing of steps that may be performed by a computer system (402) ((100) in FIG. 1), a backup application (404) ((112) in FIG. 1), an encrypted file system (406) ((124) in FIG. 1), a remote login agent (408) ((122) in FIG. 1), and a remote computer system (410) ((102) in FIG. 1), in accordance with the flowcharts in FIG. 2 and FIG. 3. In this example, a computer system (402) seeks to perform a backup of a remote computer system (410) via a backup application (404). Authentication of the computer system (402) may be performed by the remote computer system (410) based on a private key stored in an encrypted file system (406). The private key may be transferred from the backup application (404) to a remote login agent (408) that uses the private key to establish a secure connection to the remote computer system (410).

In Step 418, a virtual machine (e.g., a non-global zone of the Solaris operating system) is created on the computer system (402), for example, by a system administrator of the computer system (402). A major purpose of the virtual machine is to provide a computing environment dedicated to the backup application (404) that limits and isolates the impact of the security restrictions (e.g., preventing interactive access to the root account) on other applications hosted by the computer system (402).

In Step 420, a private key is obtained by the computer system (402) (e.g., from a key distribution authority). For example, a system administrator (or administrative software tool) may create the private key while logged into a root account on the computer system (402). The system administrator (or administrative software tool) may store the private key in the root home directory on the computer system (402). The private key may correspond with a public key stored on the remote computer system (410) in an asymmetric cryptography scheme.

In Step 422, the computer system (402) stores the private key in the encrypted file system (406) owned by the root or key account. Root or key account access privileges may be required to access the encrypted file system (406). Storing the private key in the encrypted file system (406) may be performed by system administrator (or administrative software tool). A security passphrase may be required in order to obtain access to the encrypted file system (406). The encrypted file system (406) essentially represents a secure "wallet" for the private key. The private key may be removed from the root home directory once it is safely stored in the encrypted file system (406).

In Step 424, the computer system (402) disables interactive access to the root or key account(s). This is a security precaution to prevent potential attackers from logging into the root or key account and acquiring root or key account privileges on the computer system (402) and thereby accessing the private key. The root account may be converted to a non-login account or to a root role that is inaccessible by (i.e., not assigned to) any user account, thereby preventing any user account in the virtual machine from interactively acquiring root privileges, and thereby accessing the private key in the encrypted file system (406). Similarly, the key account may be converted to a non-login account.

In Step 426, the backup application (404) is installed, with root or key account execution privileges, in the virtual machine. That is, when the backup application (404) is executed, it will have root or key account privileges. For example, the backup application (404) may access the encrypted file system (406), which requires root or key account privileges. The root or key account may be the owner of the backup application (404) (e.g., the root or key account may be listed as the owner of the binary executable file corresponding to the backup application (404)). Setting a setuid bit of the backup application (404) may indicate that the backup application (404) executes with the privileges of its owner (i.e., the root or key account).

The arguments provided to the backup application (404) may include one or more security parameters (e.g., a passphrase used to access the encrypted file system) and the name of a remote computer system (410) to which the backup application (404) will attempt to connect.

In Step 428, execution of the backup application (404) is restricted to a least privileged account. The backup application (404) may be configured to ensure (e.g., by checking the user id of user account attempting to execute the backup application (404)) that the identity of the user account attempting to execute the backup application (404) is the least privileged account.

In Step 430, the backup application (404) mounts the encrypted file system (406), and obtains the private key (Step 432) from the encrypted file system (406). Although the least privileged account does not have root or key account privileges, the backup application (404) has root or key account execution privileges, so the backup application (404) may mount the encrypted file system (406) and obtain the private key.

In Step 434, the backup application (404) unmounts the encrypted file system (406), once the private key has been obtained. This ensures that the encrypted file system (406) is mounted briefly, thereby reducing the exposure of the private key to potential attackers. After unmounting the encrypted file system (406), the passphrase of the encrypted file system (406) may be modified (e.g., as a security precaution, in case a potential attacker has eavesdropped and obtained access to a previously used security parameter).

In Step 436, the private key is transferred to a remote login agent (408) by the backup application (404). The remote login agent (408) may store a copy of the private key in a memory region associated with the remote login agent (408) for later reuse (e.g., to connect to additional remote computer systems). Therefore, accessing the encrypted file system (406) needs to be performed only once by the remote login agent (408) when accessing a series of remote computer systems using the private key.

In Step 438, the remote computer system (410) is accessed via the remote login agent (408) over a network (e.g., via the SSH protocol), using the private key. The remote login agent (408) does not need to provide login credentials or a password in order to access the remote computer system (410). That is, the remote computer system (410) is accessed in batch mode.

Figure 5A:
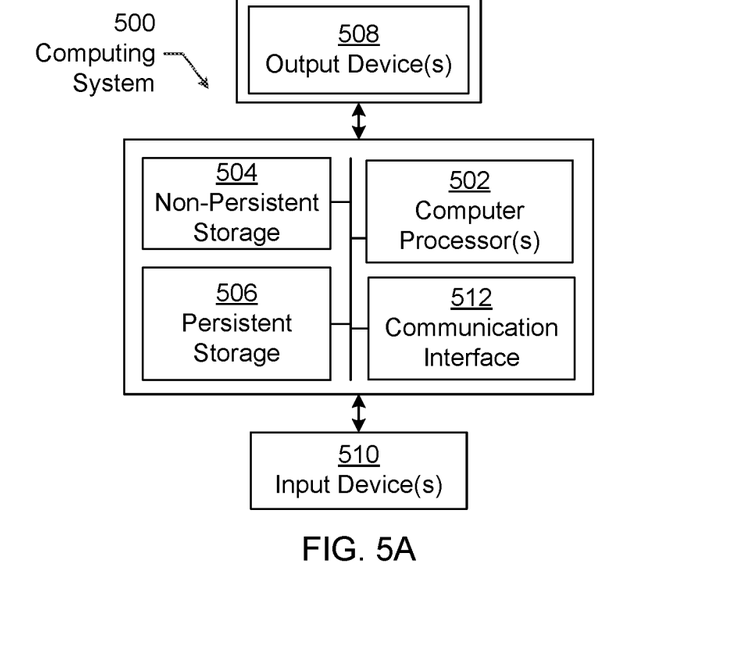
FIG. 5A and FIG. 5B show computing systems in accordance with one or more embodiments disclosed herein.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
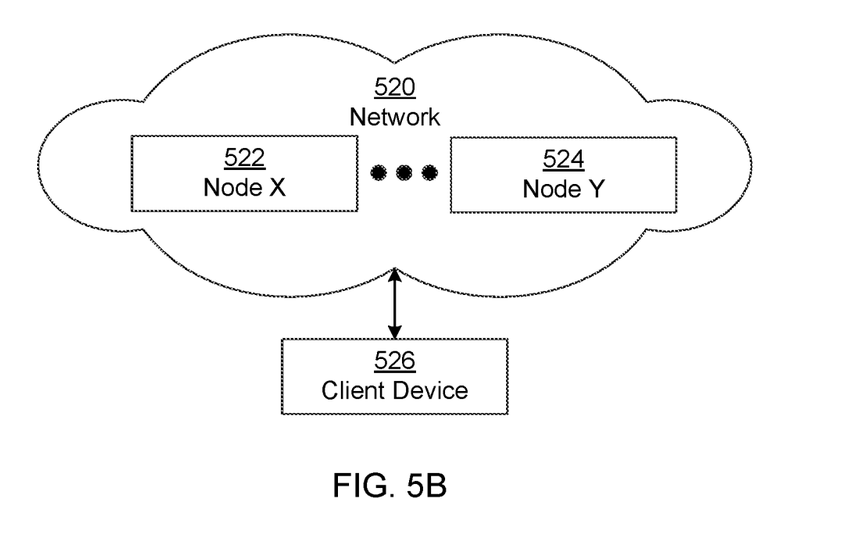

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for accessing a remote computer system, comprising:
   obtaining a private key;
   storing the private key in a file system owned by a root account;
   disabling login access to the root account from a plurality of user accounts, wherein the plurality of user accounts comprises a key account that owns the private key;
   disabling login access to the key account from the plurality of user accounts;
   creating a virtual machine comprising the root account and the plurality of user accounts;
   installing a secure application in the virtual machine with key account execution privileges;
   mounting, via the secure application, the file system;
   obtaining, via the secure application, the private key from the file system; and
   accessing, via the secure application and over a network, the remote computer system using the private key.

2. The method of claim 1, wherein disabling login access to the root account further comprises changing the root account into a root role that is inaccessible by the plurality of user accounts.

3. The method of claim 1, wherein execution of the secure application is restricted to a least privileged account of the plurality of user accounts.

4. The method of claim 1, wherein the file system is instead owned by the key account.

5. The method of claim 1, further comprising:
   unmounting the file system once the private key has been obtained.

6. The method of claim 1, wherein the file system is encrypted, and wherein mounting the file system requires a passphrase that is distinct from an encryption key of the file system.

7. A system for accessing a remote computer system, comprising:
   a computer processor:
   a memory comprising instructions that, when executed by the computer processor, cause the processor to:
   obtain a private key;
   store the private key in a file system owned by a root account;
   disable login access to the root account from a plurality of user accounts, wherein the plurality of user accounts comprises a key account that owns the private key;
   disable login access to the key account from the plurality of user accounts;
   create a virtual machine comprising the root account and the plurality of user accounts;
   install a secure application in the virtual machine with key account execution privileges;
   mount, via the secure application, the file system;
   obtain, via the secure application, the private key from the file system; and
   access, via the secure application and over a network, the remote computer system using the private key.

8. The system of claim 7, wherein disabling login access to the root account further comprises changing the root account into a root role that is inaccessible by the plurality of user accounts.

9. The system of claim 7, wherein execution of the secure application is restricted to a least privileged account of the plurality of user accounts.

10. The system of claim 7, wherein the file system is instead owned by the key account.

11. The system of claim 7, wherein the memory further comprises instructions that, when executed by the processor:
    unmount the file system once the private key has been obtained.

12. The system of claim 7, wherein the file system is encrypted and wherein mounting the file system requires a passphrase that is distinct from an encryption key of the file system.

13. A non-transitory computer readable medium comprising instructions that, when executed by a processor, perform a method for accessing a remote computer system, the method comprising:
    obtaining a private key;
    storing the private key in a file system owned by a root account;
    disabling login access to the root account from a plurality of user accounts, wherein the plurality of user accounts comprises a key account that owns the private key;
    disabling login access to the key account from the plurality of user accounts;
    creating a virtual machine comprising the root account and the plurality of user accounts;
    installing a secure application in the virtual machine with key account execution privileges;
    mounting, via the secure application, the file system;
    obtaining, via the secure application, the private key from the file system; and
    accessing, via the secure application and over a network, the remote computer system using the private key.

14. The non-transitory computer readable medium of claim 13, wherein disabling login access to the root account further comprises:
    changing the root account into a root role that is inaccessible by the plurality of user accounts.

15. The non-transitory computer readable medium of claim 13, wherein execution of the secure application is restricted to a least privileged account.

16. The non-transitory computer readable medium of claim 13, wherein the file system is instead owned by the key account.

17. The non-transitory computer readable medium of claim 13, wherein the method further comprises:
    unmounting the file system once the private key has been obtained.

* * * * *